United States Patent
Love et al.

(10) Patent No.: US 7,853,220 B2
(45) Date of Patent: Dec. 14, 2010

(54) ADAPTIVE BROADCAST MULTICAST SYSTEMS IN WIRELESS COMMUNICATION NETWORKS

(75) Inventors: Robert T. Love, Barrington, IL (US); Hao Bi, Lake Zurich, IL (US); Brian K. Classon, Palatine, IL (US); Joseph R. Schumacher, Glen Ellyn, IL (US); Dah-Lain Almon Tang, Naperville, IL (US)

(73) Assignee: Motorola Mobility, Inc., Libertyville, IL (US)

( * ) Notice: Subject to any disclaimer, the term of this patent is extended or adjusted under 35 U.S.C. 154(b) by 11 days.

(21) Appl. No.: 12/399,163

(22) Filed: Mar. 6, 2009

(65) Prior Publication Data

US 2009/0168686 A1    Jul. 2, 2009

Related U.S. Application Data

(62) Division of application No. 11/469,144, filed on Aug. 31, 2006, now abandoned.

(51) Int. Cl.
*H04B 1/00* (2006.01)

(52) U.S. Cl. .................. 455/69; 455/67.13; 455/68; 455/522; 370/312; 370/317; 370/318; 370/432

(58) Field of Classification Search ............... 455/63.1, 455/67.13, 68, 69, 522, 518, 519; 370/312, 370/317, 318, 329, 330, 337, 347, 432
See application file for complete search history.

(56) References Cited

U.S. PATENT DOCUMENTS

| | | | |
|---|---|---|---|
| 5,881,368 A | 3/1999 | Grob et al. | |
| 6,334,047 B1 | 12/2001 | Andersson et al. | |
| 6,360,076 B1 | 3/2002 | Segura et al. | |
| 6,397,041 B1 * | 5/2002 | Ballard et al. | 455/67.11 |
| 6,498,932 B1 | 12/2002 | Silventoinen et al. | |
| 6,628,639 B1 * | 9/2003 | Ishii | 370/346 |
| 7,440,759 B2 * | 10/2008 | Kang et al. | 455/452.1 |
| 7,676,230 B2 * | 3/2010 | Kang et al. | 455/450 |
| 2003/0134655 A1 | 7/2003 | Chen et al. | |
| 2004/0218567 A1 | 11/2004 | Budka et al. | |
| 2005/0129058 A1 | 6/2005 | Casaccia et al. | |

(Continued)

FOREIGN PATENT DOCUMENTS

EP    1482671 A1 *  12/2004

(Continued)

OTHER PUBLICATIONS

Jean-Chrysostome Bolot, Thierry Turletti, Ian Wakeman, Scalable feedback control for multicast video distribution in the internet, Oct. 1994, ACM, vol. 24, Issue 4, pp. 58-67.*

(Continued)

*Primary Examiner*—Charles N Appiah
*Assistant Examiner*—Olumide T Ajibade Akonai
(74) *Attorney, Agent, or Firm*—Roland K. Bowler, II

(57) ABSTRACT

A wireless communication terminal configured to receive broadcast information on a broadcast channel, to start a timer when a reception quality of the received broadcast information degrades below a specified level on the broadcast channel, and to transmit feedback information only after starting the timer.

8 Claims, 2 Drawing Sheets

U.S. PATENT DOCUMENTS

| | | |
|---|---|---|
| 2005/0201296 A1 | 9/2005 | Vannithamby et al. |
| 2006/0116080 A1* | 6/2006 | Eom .......................... 455/62 |
| 2007/0047502 A1* | 3/2007 | Marinier et al. ............. 370/335 |
| 2007/0091817 A1* | 4/2007 | Yoon et al. .................. 370/252 |
| 2007/0238462 A1* | 10/2007 | Pedersen .................... 455/436 |
| 2008/0043706 A1* | 2/2008 | Reznik ....................... 370/347 |
| 2008/0045228 A1* | 2/2008 | Zhang et al. ................ 455/450 |
| 2008/0198785 A1* | 8/2008 | Huang et al. ................ 370/312 |

FOREIGN PATENT DOCUMENTS

| | | |
|---|---|---|
| WO | 03049353 A1 | 6/2003 |
| WO | WO 04002048 A1 * | 12/2003 |
| WO | 2005078974 A1 | 8/2005 |

OTHER PUBLICATIONS

Jorg Nonnenmacher, Ernst W. Biersack, Scalable Feedback for Large Groups, Jun. 1999, IEEE/ACM Transactions on Networking, vol. 7, No. 3, pp. 375-386.*

* cited by examiner

ADAPTIVE BROADCAST MULTICAST SYSTEMS IN WIRELESS COMMUNICATION NETWORKS

CROSS REFERENCE TO RELATED APPLICATIONS

The present application is a division of U.S. application Ser. No. 11/469,144 filed on 31 Aug. 2006, now abandoned, the contents of which are hereby incorporated by reference and from which benefits are claimed under 35 U.S.C. 120.

FIELD OF THE DISCLOSURE

The present disclosure relates generally to wireless communications and, more particularly, to adaptive broadcast multicast systems in wireless communication networks, corresponding entities and methods.

BACKGROUND

In wireless communication networks, Broadcast/Multicast services require minimal involvement from wireless communication terminals subscribed to the service. It is, for example, unnecessary for the terminal to provide ARQ information (ACK/NAK) or channel quality information (power control, C/I feedback, etc.) to the content broadcast entity. While multiple modulation and coding schemes and power levels may be available to non-broadcast users, for example, two-way cellular communication terminals, broadcast transmission implements fixed modulation and coding schemes. Under these circumstances, however, the efficiency of the selected broadcast modulation and coding schemes may not be optimized. For example, the broadcast entity may use too many or too few resources, or it may provide an unduly low or excessively high data rate, or it may provide an excessive received error rate for the current set of terminals.

U.S. Pat. No. 5,881,368 entitled "Method and Apparatus of Power Control in a CDMA System" discloses a broadcast base station that increases forward link broadcast power in response to a power request access message from a mobile unit in the base station coverage area. In the absence of such a request, the base station slowly decreases the power on the forward link broadcast channel, which may be terminated completely.

The various aspects, features and advantages of the disclosure will become more fully apparent to those having ordinary skill in the art upon careful consideration of the following Detailed Description thereof with the accompanying drawings described below. The drawings may have been simplified for clarity and are not necessarily drawn to scale.

DETAILED DESCRIPTION

Figure 1:
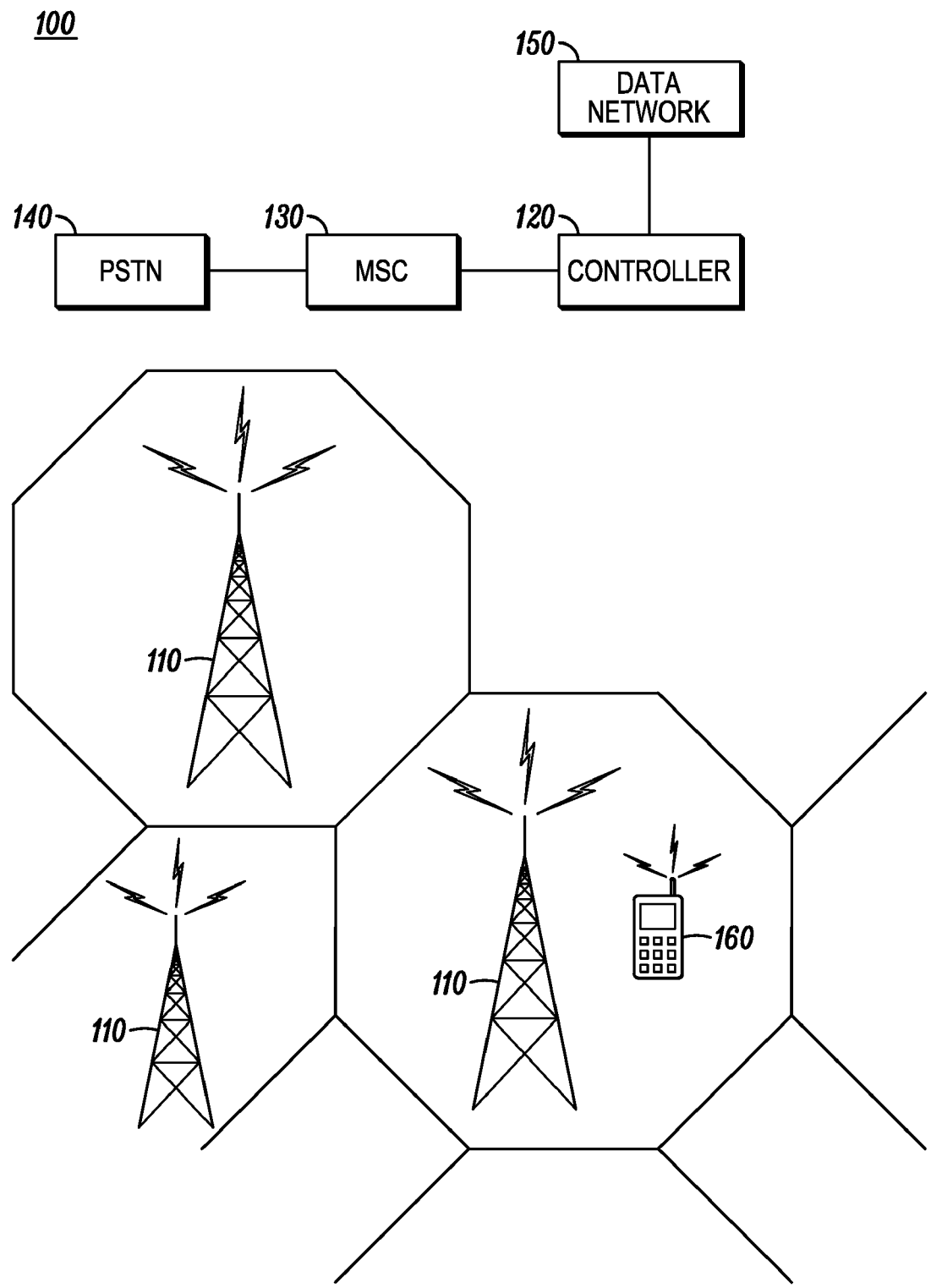
FIG. 1 illustrates a wireless communication network.

In FIG. 1, the illustrative wireless communication network 100 generally comprises one or more access networks communicably coupled to one or more core networks. The access network includes a plurality of base stations 110, one or more of which are communicably coupled to a controller entity 120. The core network includes a mobile switching center (MSC) 130 communicably coupled to location registers, for example home and visitor location registers, or similar entities known generally by those having ordinary skill in the art. The MSC may be communicably coupled to a public switched telephone network (PTSN) 140 and to a mobility and data session management entity coupled to a network gateway, for example, a serving GPRS support node (SGSN), coupled to a gateway GPRS support node (GGSN). Wireless communication terminals, for example, subscriber terminal 160 in FIG. 1, communicate within the wireless communication network and/or with other networks, for example, data network 150, via the access and core networks. Such terminals are also referred to herein as users, mobile stations, mobiles and user equipment.

Exemplary communication networks include 2.5 Generation 3GPP GSM networks, 3rd Generation 3GPP WCDMA networks, and 3GPP2 CDMA communication networks, among other existing and future generation cellular communication networks. Future generation networks include the developing Universal Mobile Telecommunications System (UMTS) networks and Evolved Universal Terrestrial Radio Access (E-UTRA) networks. The network may also be of a type that implements frequency-domain oriented multi-carrier transmission techniques, such as Frequency Division Multiple Access (OFDM), DFT-Spread-OFDM (DFT-SOFDM), and single-carrier based approaches with orthogonal frequency division (SC-FDMA), particularly Interleaved Frequency Division Multiple Access (IFDMA) and its frequency-domain related variant known as DFT-Spread-OFDM (DFT-SOFDM). Other networks include WAN and LANs. The disclosure is not limited however to these exemplary networks, but is applicable more generally to any network where power control on a broadcast channel is desired, as discussed below.

A broadcast entity, for example, one or more of the base stations 110 in FIG. 1, broadcast content or other information, for example, control or system information, on a broadcast channel for receipt by broadcast subscriber terminals in the network. In the process diagram 200 of FIG. 2, at 210, the broadcast entity transmits a report triggering command to wireless terminals within the network. A base station or an access point, for example, would broadcast the report triggering command to all terminals within its coverage area. The report triggering command generally triggers reporting of feedback information for the broadcast channel by the terminals.

Figure 2:
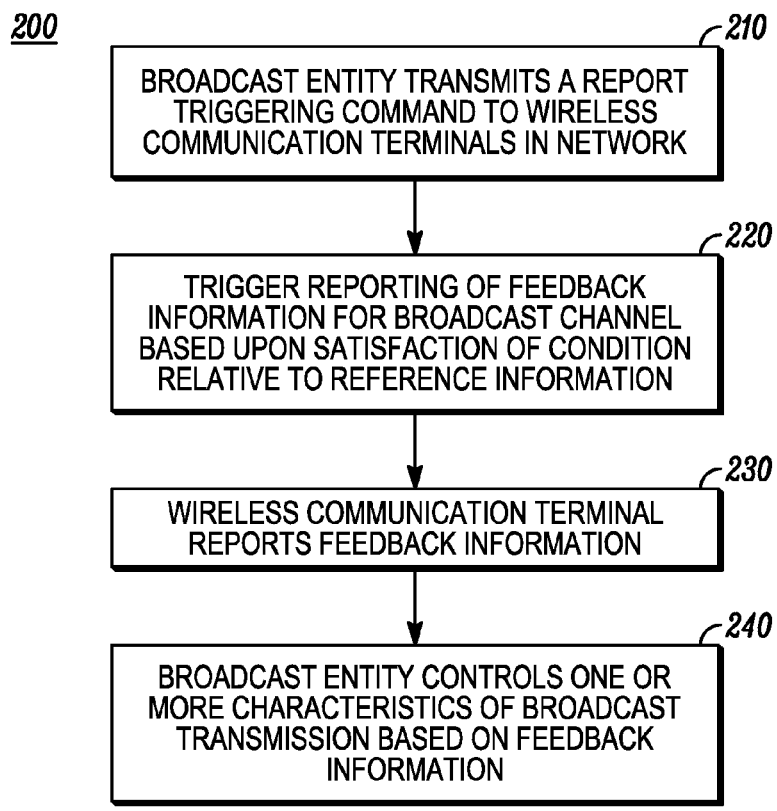
FIG. 2 illustrates a process flow diagram.

In FIG. 2, at 220, the report triggering command triggers the reporting of feedback information for the broadcast channel by wireless communication terminals upon satisfaction of a condition of the channel relative to reference information. In one embodiment, the reference information is included with the report triggering command. In another embodiment, the reference information is stored on or is generated by or otherwise obtained by the wireless terminal. The channel quality trigger may be known a priori by the broadcast receiver (e.g., a wireless communication terminal), transmitted in a control message by the broadcast transmitter, or determined at the receiver by observing a CRC error rate on received packets. The trigger may be set for a minimum quality of service, and may be sent on one layer (e.g., a base layer) or a multilayer transmission. The determination of whether a condition is satisfied based on the reference information is made at the wireless communication terminal. Examples of reference information include a threshold for channel quality, wherein the terminal sends a report when the channel quality experienced by the terminal is below the threshold. Another example is a threshold based on a number of observed frame errors or frame error rate wherein the terminal sends a report when the number of errors or error rate experienced by the terminal is above the threshold. In another embodiment, the reference information may be embodied as an objectively computed speech or video quality metric threshold.

In one embodiment, the reference information is selected to reduce triggering of reporting of feedback information for the broadcast channel by wireless communication terminals experiencing better channel conditions. Thus according to this aspect of the disclosure, only terminals that experience relatively worse channel conditions report feedback information to the base station or access point and terminals that experience better channel conditions do not. For example, per broadcast channel quality (or possibly a minimum supportable rate in the case of CDMA 1xEVDO) reference information may be provided to trigger broadcast users with the worst channel conditions to report current channel quality, for example, common pilot Ec/Nt or supportable rate information, and ACK/NAK information in order to drive power control/rate selection of the broadcast channel, thereby eliminating uplink signaling/transmissions from terminals with better channel conditions.

Figure 3:
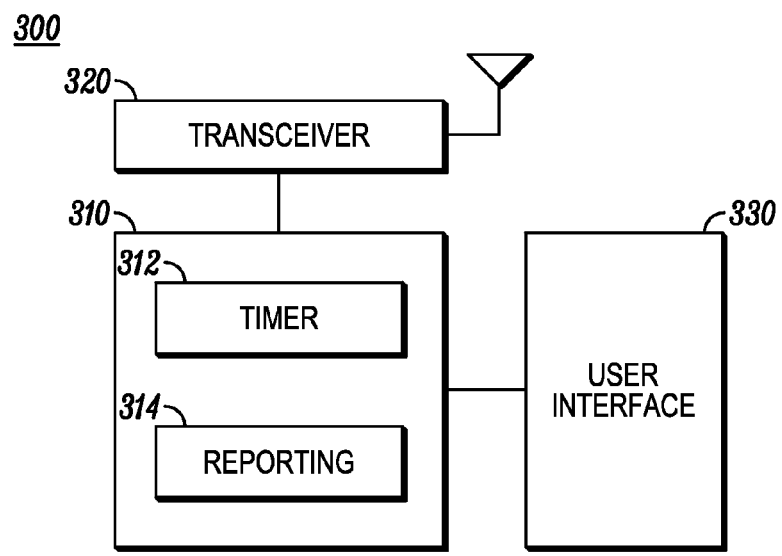
FIG. 3 is a schematic wireless communication terminal.

In one embodiment, a timer on the terminal is started or reset when signal reception quality on the broadcast channel degrades below a specified level. The terminal experiencing the degraded signal transmits feedback information until the timer expires. In one embodiment, the feedback information is transmitted until the timer expires. The feedback information may include transmitting channel quality information and/or acknowledgement information. The terminals only transmit feedback information while the timer is running. In FIG. 3, a terminal 300 comprises a controller 310 communicably coupled to a wireless transceiver 320. The terminal also comprises a user interface 330, which typically includes a display and keypad among other inputs and outputs known generally by those having ordinary skill in the art. The controller also includes a timer 312 that may be started or reset based on the signal reception quality as discussed herein. The timer may be implemented as software or as hardware logic circuits or as a combination thereof.

In a more particular implementation, an autonomous timer on the wireless terminals is set or reset (e.g., to a non-zero value) when the broadcast channel signal quality degrades, for example, each time a CRC failure is detected. According to this aspect of the disclosure, the non-zero timer is used to trigger reporting of current channel quality information and ACK/NAK information in order to drive power control and/or rate selection of the broadcast channel. Expiration of the timer is used to prevent terminals experiencing better channel conditions from signaling/transmitting on the uplink. Thus only mobiles having CRC failure for the broadcast channel send CQI and ACK/NAK information until a timer expires. The timer is reset (e.g., to the nonzero value) each time a broadcast channel CRC failure or two closely spaced CRC failures are detected by the terminal. Requiring the detection of two closely spaced CRC failures would limit terminals from entering into the reporting mode.

In one embodiment, the base station slowly reduces the transmit power of the broadcast channel while no CQI and ACK/NAK information is received from any terminals. Otherwise, the broadcast transmit power level is controlled based on the reported CQI and ACK/NAK feedback.

In one implementation, each broadcast service is mapped to a target SNR or target channel quality indicator (CQI), which is broadcast or signaled with a dedicated channel to terminals in the serving cell's service area, such that terminals in the service area can determine a trigger for sending uplink CQI and ACK/NAK information. That is, terminals or mobiles that measure CQI from the pilot channel or other broadcast or dedicated channel of the best serving base station greater than a target (e.g., CQI-CQIoffset1) send uplink CQI and ACK/NAK information periodically to the base station until the measured CQI is greater than another target (e.g., CQI+CQIoffset2). While no CQI and ACK/NAK information is received from any mobiles, the base station slowly reduces the transmit power of the broadcast channel. Otherwise, the transmit power on the broadcast channel is controlled based on the reported CQI and ACK/NAK feedback. To further reduce uplink interference created by CQI and ACK/NAK and to improve reliability, the CQI and ACK/NAK information can be repeated, for example, x2 or x4 or x8 repetition. In some embodiments, for example, in the case of 1xEVDV and HSDPA, it may be necessary to use a group ID on the common control channel.

When more than one terminal is reporting CQI and ACK/NAK information, the information from the terminal having the lower reported CQI levels or from the terminal currently reporting a NAK is used to determine the downlink broadcast transmit power. The uplink transmit power level is determined by open loop power control and a turn around factor or a similar technique as used with the RACH in WCDMA. In the case were a downlink common power control channel is used for sending reverse link power control information only, users with the worst channel conditions (those that send feedback information) would be allocated space on the common power control channel. In the case of WCDMA/HSDPA, a downlink associated DPCH could be assigned to terminals sending feedback information, which could support fast uplink power control. Also, terminals could transmit on a common uplink broadcast channel (e.g. random access channel) to minimize uplink channel resources needed with user specific (color) spreading codes or the terminals could include user IDs in the payload to distinguish among terminals. Feedback channel quality can be used to determine the downlink transmit power levels of the common control channels as well as the broadcast data channel.

In FIG. 2, at 230, the wireless communication terminal reports feedback information for the broadcast channel to the base station or access point. In FIG. 3, the terminal 300 includes a reporting module 314 for providing broadcast channel feedback information, for example, CQI information, to the network. In FIG. 2, at 240, the base station or access point or other broadcast entity controls one or more characteristics of the broadcast transmission based on the feedback information received from the one or more terminals. In one embodiment, for example, the broadcast entity adjusts transmission power of the broadcast channel based on feedback information received from one or more terminals in the network. In another embodiment, the base station or access point adjusts the transmission rate of the broadcast channel based on feedback information from one or more wireless communication terminals. In other embodiments, the broadcast transmitter adjusts coding and modulation based on the feedback information. Alternatively, in the presence of persistent and unexpected CQI indications from one or more terminals, the afflicted terminals could be disregarded or provided a dedicated channel, thereby allowing the remaining broadcast resources to be used more efficiently.

Reduction of dedicated channel and power control overhead is also contemplated. After the autonomous timer on the terminal expires or the broadcast channel quality exceeds the broadcast channel SNR trigger threshold, the uplink dedicated channel transmissions are DTXed. After the base station stops detecting the uplink, it stops transmitting the downlink dedicated channels including the power control bits or the power control bits on the common power control channel. When the autonomous timer is reset or the broadcast channel quality drops below the SNR trigger threshold, a power control preamble (note this preamble exists in WCDMA) is sent on the uplink prior to resuming transmission of the uplink dedicated channel along with power control information which also triggers resumption of a downlink dedicated channel transmission by the base station along with power control commands. Presumably terminals in soft hand-off (SHO) would eventually resume dedicated channel transmission due to the broadcast channel quality triggers. A broadening of the broadcast channel quality triggers would be to include certain SHO triggering events. In some embodiments, multiple terminals may be multiplexed on the same downlink dedicated channel to save on downlink code resources.

While the present disclosure and the best modes thereof have been described in a manner establishing possession and enabling those of ordinary skill to make and use the same, it will be understood and appreciated that there are equivalents to the exemplary embodiments disclosed herein and that modifications and variations may be made thereto without departing from the scope and spirit of the inventions, which are to be limited not by the exemplary embodiments but by the appended claims.

What is claimed is:

1. A method in a wireless communication terminal, the method comprising:
   receiving broadcast information on a broadcast channel;
   starting a timer when reception quality degrades below a specified level on the broadcast channel;
   transmitting feedback information after starting the timer;
   transmitting feedback information until the timer expires.

2. The method of claim 1, not transmitting feedback information unless the timer is running.

3. The method of claim 1, transmitting feedback information includes transmitting channel quality information.

4. The method of claim 1, transmitting feedback information includes transmitting channel acknowledgement information.

5. A wireless communication terminal, comprising:
   a transceiver;
   a controller communicably coupled to the transceiver,
   the controller configured to start a timer when reception quality degrades below a specified level on a broadcast channel received by the transceiver,
   the controller configured to cause the transceiver to transmit feedback information after starting the timer,
   the controller configured to cause the transmitter to transmit feedback information until the timer expires.

6. The terminal of claim 5, the controller configured to prevent the transceiver from transmitting feedback information unless the timer is running.

7. The terminal of claim 5, the controller configured to cause the transceiver to transmit channel quality information after starting the timer.

8. The terminal of claim 5, the controller configured to cause the transceiver to transmit channel acknowledgement information after starting the timer.

* * * * *